United States Patent [19]

Dickey et al.

[11] Patent Number: 4,575,277

[45] Date of Patent: Mar. 11, 1986

[54] EASY ALIGN CONNECTION FOR SLIP-ON MALE/FEMALE FITTED JOINT

[75] Inventor: Avis M. Dickey, Kendallville; David A. Dickey, South Milford, both of Ind.

[73] Assignee: Dickey, Inc., South Milford, Ind.

[21] Appl. No.: 930,713

[22] Filed: Aug. 25, 1978

[51] Int. Cl.$^4$ ............... F16B 7/00; F16D 1/00; A01K 87/02
[52] U.S. Cl. .................... 403/361; 403/383; 403/407.1; 43/18.1
[58] Field of Search ............ 403/361, 306, 407, 383; 43/18 R, 186 F

[56] References Cited

U.S. PATENT DOCUMENTS

| | | | |
|---|---|---|---|
| 337,474 | 3/1886 | Bartlett | 43/18 R |
| 1,357,042 | 10/1920 | Gairing | 403/383 X |
| 2,745,689 | 5/1956 | Balint et al. | 403/361 X |
| 3,019,040 | 1/1962 | Fernberg | 403/361 X |
| 3,152,820 | 10/1964 | Giampa et al. | 403/361 X |
| 4,067,133 | 1/1978 | Livingston | 43/18 R |
| 4,127,342 | 11/1978 | Coggiola | 403/361 X |

FOREIGN PATENT DOCUMENTS

| | | | |
|---|---|---|---|
| 2319594 | 11/1974 | Fed. Rep. of Germany | 403/361 |
| Ad.46186 | 12/1935 | France | 43/18 R |

Primary Examiner—James Kee Chi

[57] ABSTRACT

A new and improved aligning rod connector provides for securement in and to end alignment of rod sections (i.e., to fishing rod sections) by employment of a D-shaped shaft member affixed to one rod section and inserted into a chamber member with D-shaped bore, the latter member either an outwardly conforming with shaft D-shape or an outward symmetrical with rod shape, affixed to a second rod section end. The bore's three-fourths arcuate wall and one-fourth flattened surface of either outwardly differently configured chamber member is longitudinally coextensive from entrance to bottom thereof, and the three-fourths arcuate wall and flattened one-fourth surface of the shaft member is longitudinally coextensive from end to end, each member dimentioned to provide optimum frictional engagement in the radially outward pressing of said shaft against chamber bore, creating high intensity of frictional grip and suction, thereby precluding movement and dislodgment.

1 Claim, 17 Drawing Figures

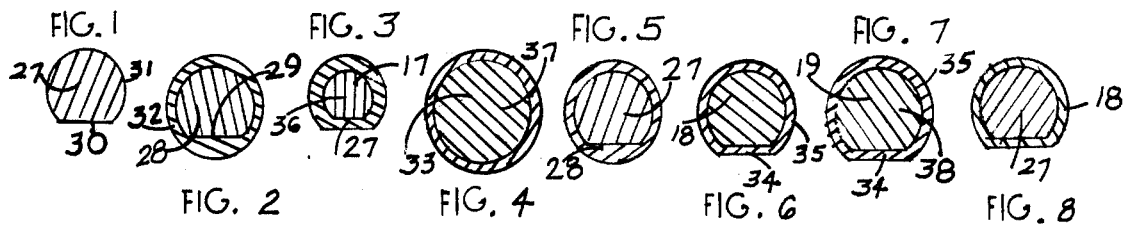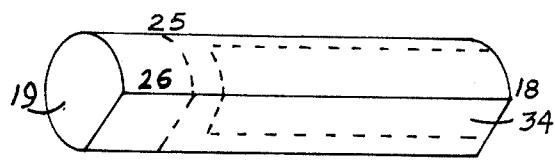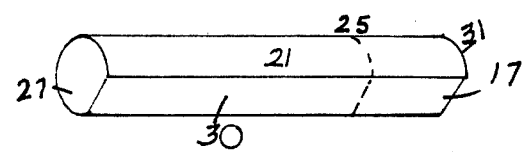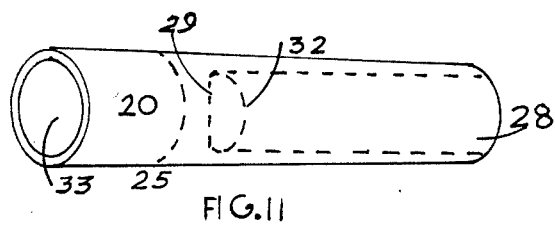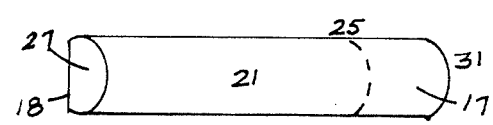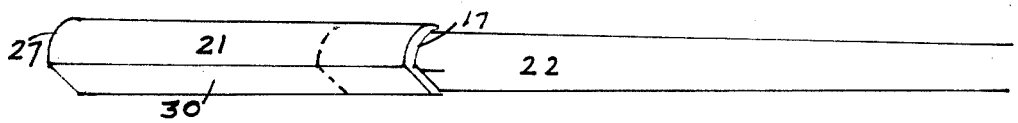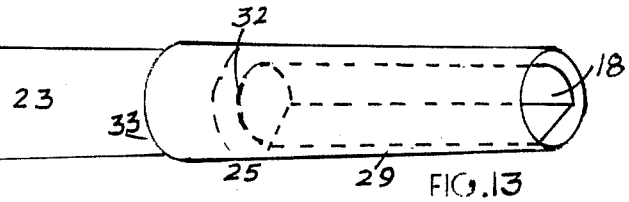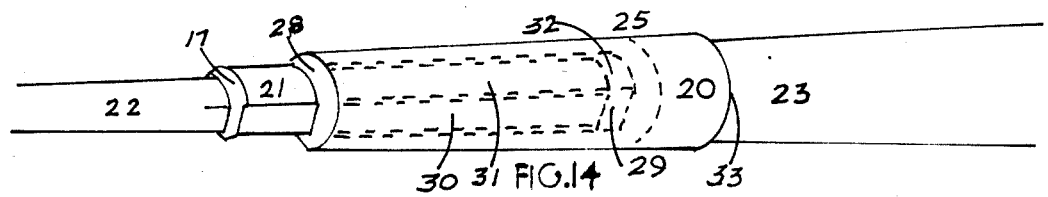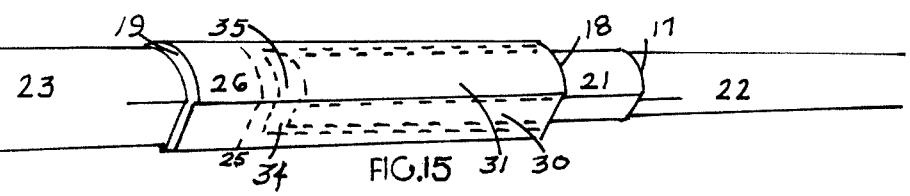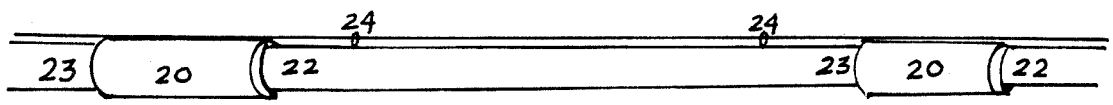

EASY ALIGN CONNECTION FOR SLIP-ON MALE/FEMALE FITTED JOINT

SUMMARY OF THE INVENTION

The new and improved aligning rod connector provides for the alignment of two or more rod sections (i.e., fishing rod sections) in end to end securement with the employment of a D-shaped shaft member affixed to one rod section and and a like configured chamber bore member affixed to a second rod section end, said shaft and chamber bore dimentioned to ensure the radially outward pressment in frictional engagement of the shaft's three-fourths arcuate wall and one-fourth flattened surface against the three-fourths arcuate wall and one-fourth flattened surface of the chamber bore.

Another object of the invention is to provide for economy and simplicity of manufacture from a multiplicity of materials (i.e., metal, plastic, fiber, etc.) and the equal economy and simplicity of affixment in any preferred method.

A third object of the invention is the provision of an aligning rod section connector given to withstanding considerable torque and pull without dislodgment or movement, the same had by varying longitudinal measurement and thickness of chamber and shaft members in conformity with longitudinal measurement and thickness of rod sections.

A fourth object of the invention is for simplest utilization.

A fifth object of the invention is for employment with all frictionally engaging rod sections, irrespective of thickness, length, or outer contour.

Other objects and advantages of the invention will become evident in the drawings, specifications, and claime.

BRIEF DESCRIPTION OF THE DRAWINGS

FIG. 1 is the end view of the D-shaped shaft member, while FIG. 2 is the end view of the corresponding chamber member outwardly symmetrical with rod shape.

FIG. 3 is the rod-receiving end view of the FIG. 1 shaft member and FIG. 4 depicts the rod-receiving and configuration of the FIG. 2 chamber member.

FIG. 5 is the end view of the FIG. 1 shaft member and FIG. 2 chamber member frictionally engaged.

FIG. 6 depicts the D-shaped chamber member outwardly conforming to shaft configuration, with FIG. 7 depicting the member's rod receiving end and FIG. 8 showing the end view of the FIG. 6 and FIG. 1 members frictionally engaged.

FIG. 9 is a perspective side view of the outwardly D-configured chamber member showing relation of ends FIGS. 6 and 7.

FIGS. 10A and 10B are perspective side views of the shaft member showing relation of ends FIG. 1 and FIG. 3 while FIG. 12 shows said shaft member FIG. 10A and FIG. 10B affixed to a rod section.

FIG. 11 is the perspective side view of the outwardly symmetrical with rod chamber member, showing relation of ends FIGS. 2 and 4, while FIG. 13 shows said chamber member affixed to rod section.

FIG. 14 depcits perspective side view of the affixed shaft member FIG. 12 in frictional engagement with the affixed chamber member FIG. 13.

FIG. 15 shows the perspective side view of the affixed shaft member FIG. 12 in frictional engagement with chamber member FIG. 9 affixed to a rod section, such as rod section depicted in FIG. 13.

FIG. 16 depicts a section of aligned rod (i.e., fishing rod) employing aligning rod connectors.

DESCRIPTION OF PREFERRED EMBODIMENTS

The FIG. 1 flattened one-fourth surface 30 and three-fourths arcuate wall 31 of the shaft end 27 and the outwardly symmetrical with rod chamber member FIG. 2 with its one-fourth flattened surface 29 and three-fourths arcuate wall 32 of bore 28 of the outwardly symmetrical with rod chamber member 20 are depicted in frictional engagement in FIG. 5.

The shaft receiving cavity 17 of FIG. 3 is depicted in proximity to its opposite end 27 FIG. 1 in the perspective side views FIGS. 10A and 10B. The chamber rod-receiving cavity 33 of FIG. 4 is depicted in proximity to its opposite bore end 28 FIG. 2 in the side view of the said outwardly symmetrical with rod chamber member FIG. 11.

FIG. 3 further depicts the D-configured end 36 of rod 22 conforming to the rod-receiving cavity 17 of shaft member 21 to which it is affixed, said end view being concealed within the chamber cavity. FIG. 4 further depicts the circular end 27 of rod 23 conforming to the circular rod-receiving cavity 33 of chamber member 20 to which it is affixed, said end view being concealed within the chamber cavity.

The bore end view of an outwardly D-configured chamber member 18 FIG. 6 is depicted frictionally engaged with shaft member end 27 in FIG. 8 while the rod-receiving cavity 19 FIG. 7 of the said chamber member 26 is shown in relation to its opposite end 18 in perspective side view FIG. 9. FIG. 7 further depicts the D-configured rod-receiving cavity 19 of chamber member 26 to which it is affixed, said end view being concealed within the chamber cavity.

Shaft and chamber members are dimensioned of sufficient longitudinal measurement and thickness for securement in frictional engagement. (I.e., typical fishing aligning rod connector may be two inches over all longitudinal measurement for shaft and three-fourths inch rod-receiving cavity 25 and two and three-fourths inches over all longitudinal measurement for chamber with three-fourths inch rod-receiving cavity 25.) Affixment to rod sections may be had by a plurality of methods (i.e., bonding, molding, press clamping, etc.)

FIG. 14 is a perspective side view of shaft member 21 FIG. 12 and chamber member FIG. 13 frictionally engaged, showing shaft one-fourth flattened surface 30 and three-fourths arcuate wall 31 in close proximity to one-fourth flattened surface 29 and three-fourths arcuate wall 32 of outwardly symmetrical with rod chamber member FIG. 13.

FIG. 15 is the perspective side view of the affixed shaft member FIG. 12 frictionally engaged with the FIG. 9 outwardly D-configured chamber member with one-fourth flattened surface 34 and three-fourths arcuate wall 35 affixed by rod receiving end 19 to rod section.

FIG. 16 is a perspective side view of an assembled aligned rod (i.e., fishing rod) with line eyes 24, said rod sections 22 and 23 employing aligning rod connector invention.

While the accompanying figures depict the aligning rod connector employed for fishing rod sections, it is understood said aligning rod connectors may be employed with any rod sections wherein aligned assembly of rod sections by frictional engagement is desired.

We claim:

1. A frictionally engaging aligning rod connector wherein two or more rod sections are secured in linear frictional alignment with the employment of (a) a longitudinally coextensive from end to end, generally D-configured shaft member with three-fourths arcuate wall and one fourth flattened surface, being permanently affixed to one rod section end, and an outwardly symmetrical-with-rod chamber member having a D-configured chamber bore of three-fourths arcuate wall and one-fourth flattened surface longitudinally coextensive from entrance to bottom thereof, being permanently affixed to the end of a second rod section, are dimensioned from preferred material to accommodate thickness and longitude of the two rod sections to which they are separately affixed in providing optimum frictional engagement in radially outward pressment of the inserted shaft member against said corresponding chamber bore, thereby creating sufficient high intensity of frictional grip and suction for aligned rod section securement and precluding movement and dislodgement of said aligned rod sections, the described shaft and chamber members respectively employed on each two rod section ends to be frictionally engaged in alignment:

(b) a longitudinally coextensive from end to end, generally D-configured shaft member with elements set forth in subparagraph (a) correspondingly having a D-configured chamber member with elements likewise set forth in subparagraph (a), but employing an outward D-configuration corresponding to the D-configured chamber bore, the described shaft and chamber members respectively employed on each two rod section ends to be frictionally engaged in alignment.

* * * * *